April 15, 1947. T. F. STACY 2,418,856
METHOD OF AND APPARATUS FOR INJECTION MOLDING
Filed June 20, 1939
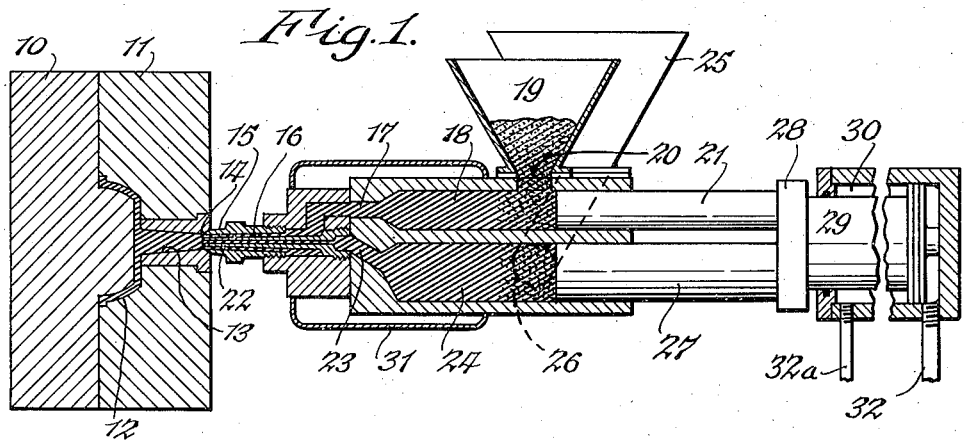
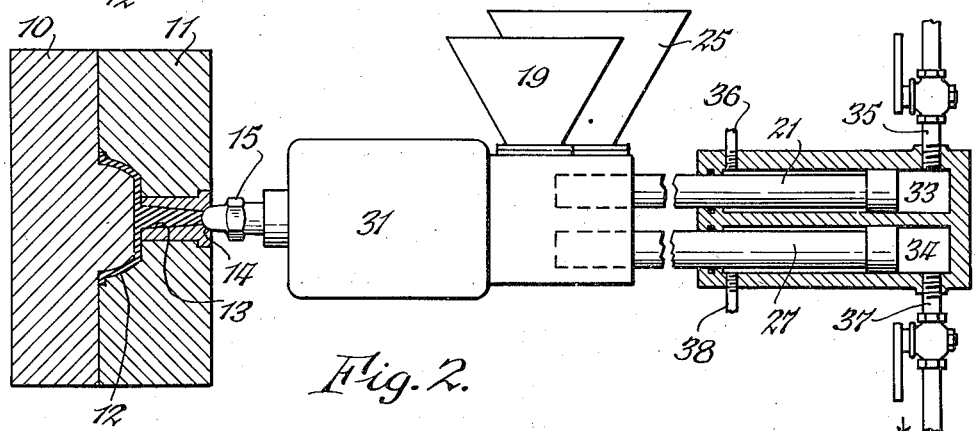
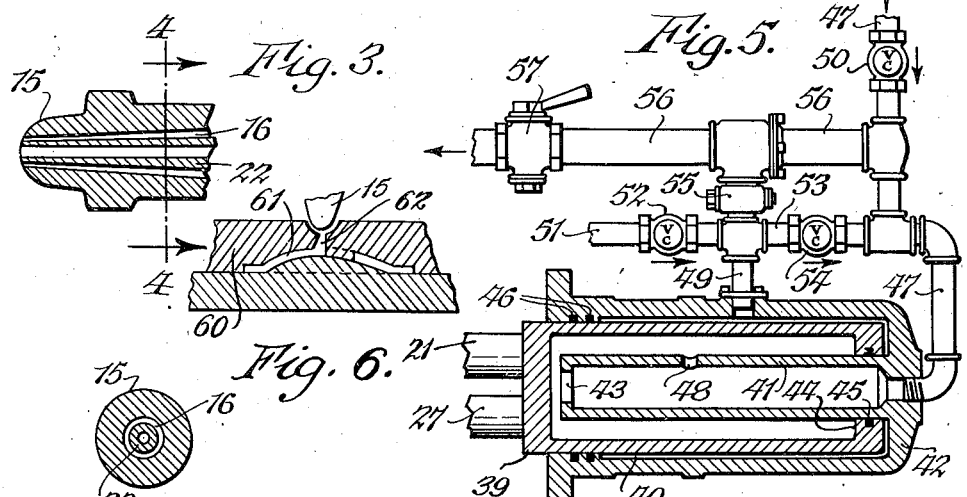
INVENTOR
Thomas F. Stacy
BY
Parker, Rockwow & Farmer
ATTORNEYS Patented Apr. 15, 1947

2,418,856

UNITED STATES PATENT OFFICE 2,418,856

METHOD OF AND APPARATUS FOR INJECTION MOLDING

Thomas F. Stacy, Piqua, Ohio, assignor to The French Oil Mill Machinery Company, Piqua, Ohio Application June 20, 1939, Serial No. 280,086

15 Claims. (Cl. 18—30)

This invention relates to injection molding, and particularly to an improved method of and apparatus for injection molding.

An object of the invention is to provide an improved method of and apparatus for injection molding, with which a more perfect union may be obtained between the streams of the fluid molding material in a mold where a union of different streams in the same mold is necessary.

Another object of the invention is to provide an improved method of and apparatus for injection molding, by which molding materials of different characteristics and colors may be blended in a molded article in a manner to produce a mottling of the different materials in the article in a simple and practical manner, and without reducing the speed of molding.

Another object of the invention is to provide an improved method of and apparatus for injecting materials into the mold with maximum speed and economy, and with maximum desired final molding pressure.

Various other objects and advantages will be apparent from the following description of some embodiments of the invention, and the novel features will be particularly pointed out hereinafter in connection with the appended claims.

In the accompanying drawing:

Fig. 1 is a sectional elevation through a portion of an injection molding device constructed in accordance with this invention, for admitting materials of different characteristics simultaneously into the mold in measured proportions;

Fig. 2 is a sectional elevation somewhat similar to Fig. 1, but illustrating separate means for operating and controlling the injection rams;

Fig. 3 is a longitudinal sectional elevation through part of the nozzle, on an enlarged scale;

Fig. 4 is a transverse sectional elevation of the same, the section being taken approximately along the line 4—4 of Fig. 3;

Fig. 5 is a view partly in section and partly in elevation of one example of means for operating the injection rams first rapidly under low pressure followed automatically by a slower movement at a relatively high pressure; and Fig. 6 is a section through a mold constructed in accordance with this invention and illustrating another embodiment thereof.

In the embodiment of the invention illustrated in Figs. 1, 3 and 4, the mold is formed with two separable sections 10 and 11 having a molding chamber or cavity 12 between the abutting faces. This chamber 12 communicates by means of a gate 13 with an entrance port 14. An injection nozzle 15 is disposed, during an injection operation, in firm engagement with the entrance port or opening 14, being firmly pressed thereagainst in any manner usual in injection molding machines. The nozzle possesses a conduit or passage 16 running endwise therein and opening through that end of the nozzle abutting the port 14 so as to discharge an injection fluid into the gate 13. The other end of the passage 16 is connected by a passage 17 to an injection cylinder 18, which is supplied with an injection material in any suitable manner common in the art, such as through a feed hopper 19 or other source of the material, the hopper 19 feeding the material by gravity into the injection cylinder through a port 20.

An injection plunger or ram 21 reciprocates in and closes the outer end of the injection cylinder 18, and as the plunger or ram 21 is forced endwise in an injection stroke, it first shuts off or closes the port 20 to prevent escape of the molding material back to said source. It then forces some of the injection molding material in the cylinder 18 into and along passage 17, and then through the passage 16 of the nozzle into the mold, as usual in injection molding machines. Within the nozzle I dispose a hollow tube 22 which is considerably smaller than the passage 16 and extends therealong preferably to approximately the discharge or delivery end thereof. This hollow tube 22 is open adjacent the discharge end of the nozzle so as to also discharge a fluid through the nozzle into the gate 13. The tube 22, being smaller than passage 16, is spaced from the wall of the passage 16 adjacent the discharge end of the nozzle, and its passage is connected by a passage 23 to an injection cylinder 24 which is supplied with molding material, or other fluid to be injected, through a hopper 25 or other suitable source of the injection material.

The hopper or source 25 communicates through a port 26 with the cylinder 24, and a plunger or ram 27 reciprocates in and closes the outer end of the cylinder 24. When the plunger or ram 27 is moved endwise (to the left in Fig. 1) it first closes the port 26 and then compresses the material in the cylinder 24 to force a quantity or charge of such material through the passage 23 and the hollow tube in the nozzle into the mold. The plungers 21 and 27 may be operated separately through the same or different distances, or by either a common operating means or separate means, and if by separate means the operations of the two plungers 21 and 27 may be selectively and differently controlled. In Fig. 1 the plungers 21 and 27 are shown as operated by a common motor, and for this purpose the two plungers are connected together by a common bar or yoke 28 which carries an operating, double acting ram 29 reciprocating in a cylinder 30.

When a fluid under pressure from any suitable source is admitted to one end of the cylinder 30, it forces the ram 29 outwardly, and this forces the injection plungers 21 and 27 through equal distances which may be selectively determined as usual in injection molding machines to discharge the desired amount of injection molding materials or fluids into the mold. Thus if the hoppers 19 and 25 are filled with different materials, then at each operation of the hydraulic ram 29, proportional quantities of these materials in hoppers 19 and 25 will be injected into the mold. The plungers 21 and 27 are selected to have cross sectional areas proportional to the amounts of materials to be injected at each operation, so that the proportional amounts are automatically injected at each operation. In the illustrated example, the plunger 27 is made considerably larger than the plunger 21, and therefore at each operation a substantially larger amount of material from the hopper 25 will be injected than from the hopper 19, but the proportions of the two materials will always be the same on different operations. If the materials are of different colors they produce a mottled effect in the molded article.

It will be understood that the nozzle and injection cylinders may be heated in any suitable manner, such as by a jacket 31, as usual in injection molding devices, so as to raise the temperature of the molding materials to the desired point for molding. The operating fluid under pressure is admitted to opposite ends of the cylinder 30 through pipes 32 and 32a, which are connected alternately through any suitable control valves to a source of operating fluid under pressure as usual in hydraulically operated, injection molding machines. With one stream discharged within the other through the nozzle, the injection materials will flow around the mold and intermix sufficiently to produce a mottled effect, but because of the fact that the two streams do not join or mix to any great extent before they enter the gate 13, they will not blend sufficiently to destroy the mottled effect.

In the embodiment of the invention illustrated in Fig. 2 the arrangement is the same as in Figs. 1, 3 and 4, except that the injection plungers 21 and 27, instead of being connected together for common operation as in Fig. 1, constitute separate rams operating in separate operating cylinders 33 and 34, so that these plungers 21 and 27 may be separately operated, simultaneously or at different intervals, and separately controlled. For this purpose they may be of the same or different size. Operating fluid under pressure is delivered alternately to opposite ends of the cylinder 33 from pipes 35 and 36 under the control of suitable valves as usual in hydraulically operated injection molding devices. Operating fluid under pressure is similarly delivered to cylinder 34 through pipes 37 and 38. The proportions of fluid delivered by the injection plungers at each operation may be varied by varying the extent of the stroke, or by varying the relative sizes of the plungers 21 and 27, or by variably limiting their stroke by suitable stops.

In the embodiment of the invention shown in Fig. 5, the injection plungers 21 and 27 are connected to a common ram 39 which extends into a cylinder 40, and this ram 39 may be under continuous return pressure or it may be returned in any manner common in hydraulic ram systems. The ram 39 is operated first at a relatively high speed and low pressure until the injection cylinders have nearly completed their stroke, and then the speed is automatically decreased, with higher possible pressure, during the continuance of the forward movement. I have illustrated, by way of a very simple example for accomplishing this purpose, the apparatus and system disclosed in U. S. Patent No. 975,994 of November 15, 1910. It will also be understood that the system disclosed in my copending application Serial No. 256,561, filed February 15, 1939, is also applicable for this purpose. Other systems may also be used for this purpose.

The apparatus and system shown in U. S. Patent No. 975,994 (referring to Fig. 5) employs a hollow tube 41 projecting from the closed end 42 of the cylinder 40 into that cylinder, and is provided with a port 43 at its free end. The ram 39 is tubular and telescopes over the tube 41 and has an inturned flange 44 with packing 45 which rides along the exterior of the tube 41 so as to form a movable seal therebetween. Suitable packing 46 may also be provided between the exterior of the ram 39 and the cylinder 40. Operating fluid under pressure is supplied to the interior of the tube 41 through a pipe 47, and it escapes from the tube 41 through the port 43 and forces the ram 39 outwardly of the cylinder 40. The volume of operating fluid required to cause this movement corresponds to that necessary to fill a chamber having a cross sectional area corresponding to that occupied by the tube 41, so that we have a relatively rapid traverse of the ram 39. Because of the relatively small pressure area being used, the maximum pressure is relatively small.

The tube 41 is provided intermediate of its ends with a port 48 so that after the ram 39 has completed a desired part of its travel, which would usually be just before the injection has been completed, the flanged end 44 of the ram 39 will uncover the port 48, whereupon part of the fluid entering the tube 41 from passage 47 will then escape into the cylinder 40 beyond the end of the ram 39. Thereafter, the ram 39 will travel at a much slower rate but the exposed pressure area will now be very much greater, so that a higher total presure is now possible during the remainder of the stroke. The pipe 47 is connected through a check valve 50 to a pump, accumulator, or other source of operating fluid under pressure, and this check valve 50 opens only to pass fluid in the direction of the arrow towards the cylinder 40. During the early part of the advance stroke, however, before the flange 44 uncovers the port 48, the space in back of the ram 39 at the bottom or closed end of the cylinder 40 is kept filled with an operating fluid under light or no pressure through a pipe 49.

The pipe 49 is connected to the reservoir by a pipe 51 having therein a check valve 52 which opens freely to pass fluid in the direction of the arrow towards pipe 49. The pipe 49 is also connected through a pipe 53 to the pipe 47, but the pipe 53 contains therein a check valve 54 which opens freely to pass fluid in the direction of the arrow towards pipe 47. The pipe 49 is also connected through a normally closed valve 55 to a pipe 56, one end of which is connected to the pipe 47 between the check valve 50 and the cylinder 40, and the other end of which is connected through a valve 57 to a supply tank or storage reservoir.

The operation of this system is briefly as follows: With the ram 39 in the position shown in Fig. 5, a forward or advance operating stroke of the ram 39 is initiated by connecting the pipe 47 beyond the valve 50 to the fluid pressure from a pump or accumulator through any suitable control device. The fluid from the pump or source of operating fluid then passes through the pipe 47 to the interior of the tube 41 and urges ram 39 outwardly or forwardly. As the ram 39 moves outwardly at a rapid rate, fluid is sucked into the space in the rear of that ram from the tank or reservoir through the pipe 51, valve 52 and pipe 49, due to the suction created behind the inner end of the ram 39. The valve 54 closes because of the higher pressure in the pipe 47. When the port 48 is uncovered, the suction behind the ram 39 is discontinued and valve 52 closes automatically.

When a return stroke of the ram 39 is desired, the fluid from the pump or source is cut off from the pipe 47 and valve 57 is opened. The fluid within the tube 41 then escapes through the pipe 47, pipe 56 and valve 57, and that portion behind the flange 44 of ram 39 escapes through pipes 49 and 53, valve 54, and pipes 47 and 56. At the end of the return stroke the valve 57 is closed, and the press is then ready for a new operation. If, for any reason, it is desired to utilize the maximum pressure of the ram 49 at any point in its advance before the port 48 is uncovered, it is merely necessary to open the valve 55, and then the fluid from the pump, passing valve 50, can divide, part going through the pipe 56, valve 55 and pipe 49 to the cylinder 40 behind the ram 39, and the balance entering the interior of the tube 41 through the pipe 47, as explained above.

It will be understood that one of the injection plungers 21 or 27 may be omitted or not utilized where only one injection fluid is injected into the mold, but where the rapid initial traverse with low pressure and a following slow movement with maximum possible pressure is desired. If desired, the same material may be injected by both plungers 21 and 27. It will also be understood that various other arrangements can be made for a rapid initial, low pressure travel of the injection plunger, and then for a slower speed but with higher possible pressure during the remainder of the injection operation. This arrangement is particularly useful in connection with the use of the newer injection molding materials, and also it greatly accelerates the molding operation with any material.

Where two or more materials are injected, one of the materials may be a plasticizing agent or some agent having a solvent for the molding material, especially where the injected material in the mold flows in separate streams that later unite in the mold, or one of the plastic materials injected might have more solvent for the material therein than that injected by the other plunger. Such an arrangement is particularly useful where more than one injection nozzle is working in a single die cavity. As the material flows in the die or mold cavity from one or more points, there must be, in many cases, a point or points where two separate streams or sections of the molding material will have to meet and be bonded together. Such an example is the steering wheel of an automobile where the material is obliged to flow in different streams around a circle, but which streams eventually meet at one point. By having present at the juncture of such streams some of the plasticizer or solvent, a better bond may often be obtained.

In Fig. 6 is illustrated a mold 60 which can be substituted for the mold shown in Fig. 1 and used in the same manner, except that the mold cavity 61 is toroidal in shape and the sprue opening 62 leads to the mold cavity only at one point thereof, so that when the solvent and molding material are injected, the solvent will move around the mold in advance of the molding material and thus serve to unite the streams of the molding material where they meet.

It will be understood that various changes in the details, which have been herein described and illustrated in order to explain the nature of the invention, may be made by those skilled in the art within the principle and scope of the invention, as expressed in the appended claims.

I claim as my invention:

1. In an injection molding device for resinous plastics and the like of the type in which the injection materials are delivered into a mold through an injection nozzle separable from said mold, an improved injection nozzle having a passage therein opening through the delivery end thereof, a connection for delivering an injection material to said passage, a hollow tube extending along said passage to approximately the delivery end thereof and open at said delivery end, and a connection to the interior of said tube for delivering thereto another injection material, whereby said materials may be delivered simultaneously through said common nozzle to said mold.

2. In an injection molding device for resinous plastics and the like of the type in which the injection materials are delivered into a mold through a nozzle separable from said mold, that improvement which comprises a nozzle having a pair of passages for delivery of different materials through said nozzle into said mold, separate injection rams by which said materials may be injected into said mold, a common motor connected to both of said rams for operating them simultaneously and through the same travel extent, said injection rams having cross sectional areas proportioned to deliver the proportional, desired quantities of said different materials at each operation.

3. In the method of injection molding of the type in which the injection materials are delivered in fluid condition directly into a mold, and having separate streams within the mold meeting and uniting, that improvement which comprises delivering into the mold where said streams of injected material meet to effect a union of the meeting streams, but before said streams meet, a small charge of a solvent for the injected material.

4. In the method of injection molding of the type in which the injection materials are delivered in fluid condition directly into a mold, and having separate streams within the mold meeting and uniting, that improvement which comprises delivering into the mold where said streams of injected material meet to effect a union of the meeting streams, but before said streams meet, a small charge of a liquid agent which facilitates the uniting of different streams of material at the points of juncture thereof in the mold.

5. In the method of injection molding of the type in which the injection materials are delivered in fluid condition directly into the mold and in which operation different, separate streams of the injected fluid meet within the mold and unite, that improvement which comprises providing at the juncture of such streams in the mold, but before said streams meet, a small quantity of a uniting agent containing a solvent for said materials.

6. In an injection molding method of the type in which a fluid injection material is delivered into a mold through a nozzle as a plurality of separate streams which meet and unite within the mold, that improvement which comprises the step of injecting into the mold, at said nozzle, a liquid containing a solvent for said molding material at the start of the injection, whereby said liquid will be carried around in the mold in advance of the streams of molding material to unite such streams at their junctions.

7. In an injection molding device for resinous plastics and the like of the type in which the molding material is introduced into the mold in fluid condition through a nozzle which separates from the mold between successive molding operations, that improvement in the nozzle which comprises a body having a main passage through which a stream of fluid injection material may be delivered to the discharge end of the orifice and a hollow tube extending along said passage toward, and terminating approximately at, the discharge end thereof for delivering into the stream of injection material delivered to the mold a stream of fluid of different characteristics.

8. In an injection molding device for resinous plastics and the like of the type in which a molding material is delivered in fluid condition into a mold through a nozzle which separates from the mold between successive molding operations, that improvement in the nozzle which comprises a passage opening at its discharge end through the delivery end of said nozzle and formed at its other end to receive said injection material, and a hollow tube extending into said passage and along the same toward the discharge end thereof and opening towards, discharging approximately at, said discharge end of said passage, whereby a separate fluid may also be delivered into said mold through said nozzle.

9. In the method of injection molding of the type in which the injection material is delivered into the mold through one passage by pressure and in which operation, separate streams of the injected material meet within the mold to effect a union of the meeting streams, that improvement which comprises injecting a solvent for said material into said mold through another passage approximately simultaneously with the injection of said material.

10. In an injection molding device of the type in which molding materials in fluid condition are delivered through a nozzle into a mold from which the nozzle may be separated between molding operations, that improvement in the nozzle which comprises a tubular body terminating at its discharge end in a shape formed to seat tightly against a complemental seat portion of said mold, and having a main passage opening through said formed part of said discharge end, and also a separate passage also opening through said formed end in close proximity to the discharge end of said main passage, whereby separate fluid streams may be simultaneously discharged into said mold and held under pressure therein.

11. In an injection molding device of the type in which molding materials in fluid condition are delivered through a nozzle into a mold from which the nozzle may be separated between molding operations, that improvement in the nozzle which comprises a tubular body terminating at its discharge end in a convex nose formed to seat tightly against a concave seat in an outer face of said mold, and having a main passage opening through the end of said convex nose and a separate passage also opening through said convex nose, whereby separate fluid streams may be simultaneously discharged from said nozzle into said mold and held under pressure therein.

12. In an injection molding device of the type in which molding materials in fluid condition are delivered through a nozzle into a mold from which the nozzle may be separated between molding operations, that improvement in the nozzle which comprises a tubular body terminating at its discharge end in a convex nose formed to seat tightly against a concave seat in an outer face of said mold, and having a main passage opening through the end of said convex nose, a conduit disposed in and extending along said main passage and having an open terminal end approximately at said convex end, whereby separate fluid streams may be simultaneously discharged from said nozzle through said convex end into said mold and held under pressure in said mold.

13. In an injection molding device of the type in which molding materials in fluid condition are delivered through a nozzle into a mold from which the nozzle may be separated between molding operations, that improvement which comprises a ram, means for reciprocating said ram, a pair of injection pistons connected to and operated simultaneously by said ram, an injection cylinder in which each of said pistons reciprocates, a nozzle having its discharge end formed to seat against a complemental seat on said mold and a passage opening through said formed end and connected to the discharge end of one injection cylinder, a conduit connected to the discharge end of the other of said injection cylinders and opening at its discharge end through said formed end of said nozzle.

14. In an injection molding device of the type in which molding materials in fluid condition are delivered through a nozzle into a mold from which the nozzle may be separated between molding operations, that improvement which comprises a ram, means for reciprocating said ram, a pair of injection pistons connected to and operated simultaneously by said ram, an injection cylinder in which each of said pistons reciprocates, a nozzle having its discharge end formed to seat against a complemental seat on said mold and a passage opening through said formed end and connected to the discharge end of one injection cylinder, a conduit connected to the discharge end of the other of said injection cylinders and opening at its discharge end into said passage closely adjacent said formed end of said nozzle.

15. In an injection molding system of the type in which injection material in fluid condition is delivered into a mold through a nozzle that is separable from the mold between molding operations, which comprises injecting the molding material in fluid condition through said nozzle by a hydraulic ram, advancing said ram by a fluid stream effective against a minor area of said ram to give rapid advance of the ram at relatively low pressure, and then at a predetermined position in said advance, after the mold is nearly but not entirely filled, increasing the effective area acted upon by said stream to give slower advance of said ram at a higher possible pressure, to complete the advance of said ram.

THOMAS F. STACY.

REFERENCES CITED

The following references are of record in the file of this patent:

UNITED STATES PATENTS

| Number | Name | Date |
|---|---|---|
| 1,560,368 | Bartels et al. | Nov. 3, 1925 |
| 1,952,241 | Eckert | Mar. 27, 1934 |
| 1,959,460 | Crossan | May 22, 1934 |
| 1,978,163 | Megow | Oct. 23, 1934 |
| 1,986,544 | Theuer | Jan. 1, 1935 |
| 1,997,074 | Novothny | Apr. 9, 1935 |
| 2,043,584 | Husted | June 9, 1936 |
| 2,076,412 | Oldham | Apr. 6, 1937 |
| 2,107,190 | Shaw | Feb. 1, 1938 |
| 2,151,476 | Kimble et al. | Mar. 21, 1939 |
| 2,232,104 | Ernst | May 18, 1937 |
| 2,080,783 | Petersen | Feb. 18, 1941 |
| 253,822 | Mignon | Feb. 14, 1882 |
| 2,274,279 | Shaw | Feb. 24, 1942 |

FOREIGN PATENTS

| Number | Country | Date |
|---|---|---|
| 651,486 | German | Sept. 23, 1937 |